United States Patent [19]

Imahashi et al.

[11] Patent Number: 5,350,643
[45] Date of Patent: Sep. 27, 1994

[54] SOLID POLYMER ELECTROLYTE TYPE FUEL CELL

[75] Inventors: Jinichi Imahashi; Tatsuo Horiba, both of Hitachi; Yasushi Muranaka, Katsuta, all of Japan

[73] Assignee: Hitachi, Ltd., Tokyo, Japan

[21] Appl. No.: 69,579

[22] Filed: Jun. 1, 1993

[30] Foreign Application Priority Data

Jun. 2, 1992 [JP] Japan ................... 4-165459

[51] Int. Cl.$^5$ .................. H01M 8/10; H01M 4/86
[52] U.S. Cl. ...................... 429/33; 429/30; 429/41; 429/42
[58] Field of Search ............ 429/30, 42, 41, 33

[56] References Cited

U.S. PATENT DOCUMENTS

| | | |
|---|---|---|
| 4,643,957 | 2/1987 | Takeuchi et al. |
| 4,808,493 | 2/1989 | Breault ............................ 429/42 |
| 4,894,355 | 1/1990 | Takeuchi et al. ............. 429/42 X |

FOREIGN PATENT DOCUMENTS

| | | |
|---|---|---|
| 60-35472 | 2/1985 | Japan |
| 2-86071 | 3/1990 | Japan |
| 3-102774 | 4/1991 | Japan |

*Primary Examiner*—John S. Maples
*Attorney, Agent, or Firm*—Antonelli, Terry, Stout & Kraus

[57] ABSTRACT

Provided is a solid polymer electrolyte type fuel cell which is improved in cell output characteristics by preventing the flooding phenomenon at the interface between the oxygen electrode and the electrolyte membrane, accelerating the gas diffusion and effective utilization of the active surface of the catalyst. This solid polymer electrolyte type fuel cell comprises solid polymer electrolyte membrane 1 and gas diffusion electrodes 2 and 3 provided on both sides of the membrane, said gas diffusion electrodes comprising catalyst layers 6 and 8 and gas diffusion layers 7 and 9 being provided on the outer side of the respective catalyst layers and a hydrogen-containing gas and an oxygen-containing gas being fed to the respective electrodes. In this cell, the water-repellency of the hydrogen electrode 2 is higher than that of the oxygen electrode 3 and furthermore, a gradient of water-repellency is provided in the catalyst layer of each electrode so that the water-repellency in the portion facing to the electrolyte membrane is higher than that in the portion facing to the gas diffusion layer in each catalyst layer. The output density of the cell according to the present invention is as high as 2-3 times that of conventional cells.

11 Claims, 3 Drawing Sheets

SOLID POLYMER ELECTROLYTE TYPE FUEL CELL

BACKGROUND

1. Field of the Invention

The present invention relates to a solid polymer electrolyte type fuel cell and in particular to a solid polymer electrolyte type hydrogen-oxygen fuel cell.

2. Description of Related Art

The present invention can be applied to generic solid polymer electrolyte type fuel cells. The solid poller electrolyte type fuel cells generally comprise two current collectors, a solid polymer electrolyte membrane (hereinafter referred to as "electrolyte membrane"), two electrodes between which said electrolyte membrane is interposed, and means for feeding hydrogen and oxygen as fuels. The electrodes comprise a catalyst, a carrier for supporting the catalyst, an ion (proton) conductor of the same solid polisher electrolyte as the above electrolyte and a binder for binding them. The two electrodes are a hydrogen electrode and an oxygen electrode and the electrochemical reactions in these electrodes are as follows.

In the hydrogen electrode, a hydrogen molecule is ionized into protons to release electrons. This can be shown by the following formula (1).

$$H_2 \rightarrow 2H^+ + 2e^- \tag{1}$$

The protons transfer through the ion conductor in the electrode and reach the electrolyte and further pass through the electrolyte and transfer to the oxygen electrode on the opposite side. On the other hand, the electrons released transfer to the oxygen electrode through the external circuit. In the oxygen electrode, the protons combine with the electrons released from the hydrogen electrode to form water in accordance with the following formula (2).

$$\tfrac{1}{2}O_2 + 2H_2 + 2e^- \rightarrow H_2O \tag{2}$$

The above reaction process of fuel cells comprises mainly the following four stages.

(A) Diffusion of hydrogen and oxygen onto the surface of the catalyst.
(B) Reactions on the surface of the catalyst in the hydrogen electrode and the oxygen electrode.
(C) Conduction of protons in both the electrodes and in the electrolyte.
(D) Discharging of water.

The degree of diffusion of the fuel gases and the degree of reaction rate of the fuel gases in the respective stages greatly affect the output of the cell.

In the stage (A), it has been proposed for efficient feeding and diffusion of the fuel onto the surface of the catalyst to use a corrugated current collector as shown in FIG. 1 of Japanese Patent Application Kokai (Laid-Open) No. 60-35472 and a carbon plate having rectangular grooves as disclosed in Japanese Patent Application Kokai (Laid-Open) Nos. 3-102774 and 2-86071. When said corrugated current collector or the grooved side of said carbon plate having rectangular grooves is allowed to contact with the electrode, spaces are formed therebetween and the fuel diffuses through these spaces onto the surface of the electrode.

In the solid polymer electrolyte type fuel cells, the above-mentioned structure is generally employed and the output is developed to some extent.

The protons which have passed through the electrolyte membrane produce water at the interface between the electrolyte membrane and the oxygen electrode because the reaction of the above formula (2) proceeds at the interface, and especially at a high current density, a water film is formed and so-called flooding phenomenon occurs. This water film causes decrease in contacting efficiency between the catalyst and the oxygen gas which has diffused through the oxygen electrode. As a result, reduction of output density is apt to occur and the cell performance becomes unstable. This flooding phenomenon tends to occur especially at the interface between the oxygen electrode and the electrolyte membrane. Thus, it is necessary to eliminate the produced water from the system.

U.S. Pat. No. 4,643,957 proposes to use a water repellant in the electrodes of phosphoric acid type fuel cells.

SUMMARY OF THE INVENTION

The object of the present invention is to provide a solid polymer electrolyte type fuel cell (hereinafter referred to as merely "fuel cell") which has, for carrying out the gas diffusion in the hydrogen electrode and the oxygen electrode at a high efficiency, such structure that the transfer of the protons produced by the reaction of the above formula (1) is accelerated at the hydrogen electrode and the flooding of water is inhibited at the oxygen electrode, to thereby improve the contacting efficiency between the catalyst layer of the electrode and the gas and simultaneously promote the oxidation-reduction reaction which takes place at the interface between the electrode and the electrolyte membrane.

DETAILED DESCRIPTION OF PREFERRED EMBODIMENTS

The present invention provides a solid polymer electrolyte type fuel cell which comprises a solid polymer electrolyte membrane, a hydrogen electrode and an oxygen electrode which are gas diffusion electrodes provided so as to interpose said electrolyte membrane therebetween and means for feeding a hydrogen-containing gas and an oxygen-containing gas to the hydrogen electrode and the oxygen electrode, respectively, said gas diffusion electrodes comprising a catalyst layer composed of a carbon carrier, an active component supported thereon, a proton conductor and a water repellent binder and an electron conductor which also serves as a gas diffusion layer and which is provided on the outer side of the catalyst layer, characterized in that the water repellency of the catalyst layer of the hydrogen electrode is higher than that of the catalyst layer of the oxygen electrode.

According to the present invention, the cell performance of solid polymer electrolyte type fuel cells can be improved by controlling the water repellency of the catalyst layers of the respective electrodes under a specific condition.

According to the present invention, the water repellency in the catalyst layer of the hydrogen electrode has such a gradient that it is lower in the portion facing to the electrolyte membrane than in the portion facing to the gas diffusion layer and the water repellency in the catalyst layer of the oxygen electrode has similarly such a gradient that it is lower in the portion facing to the electrolyte membrane than in the portion facing to the gas diffusion layer and moreover, the water repellency of the portion in the catalyst layer of the oxygen electrode facing to the electrolyte membrane is lower than the water repellency of the portion in the catalyst layer of the hydrogen electrode facing to the electrolyte membrane. In both the oxygen electrode and the hydrogen electrode, the catalyst layer may be in the form of one layer or two or more layers.

According to the present invention, the catalyst layers in both the hydrogen electrode and the oxygen electrode comprise a carbon carrier, an active component (catalyst) supported thereon, a proton conductor and a water repellent binder. The active component is preferably platinum or platinum group metals such as rhodium, ruthenium, palladium and iridium and materials of the proton conductor may be the same as or different from the solid polymer electrolyte. Furthermore, the water repellent binder is preferably a fluorocarbon polymer such as polytetrafluoroethylene (PTFE) or graphite fluoride represented by the formula $(CF)_n$ or a mixture thereof.

The electrolyte used in the present invention is generally in the form of a membrane and materials thereof are preferably the generally used solid polymer electrolyte resins such as a perfluorocarbonsulfonic acid resin and perfluorocarboxylic acid resin.

Figure 1:
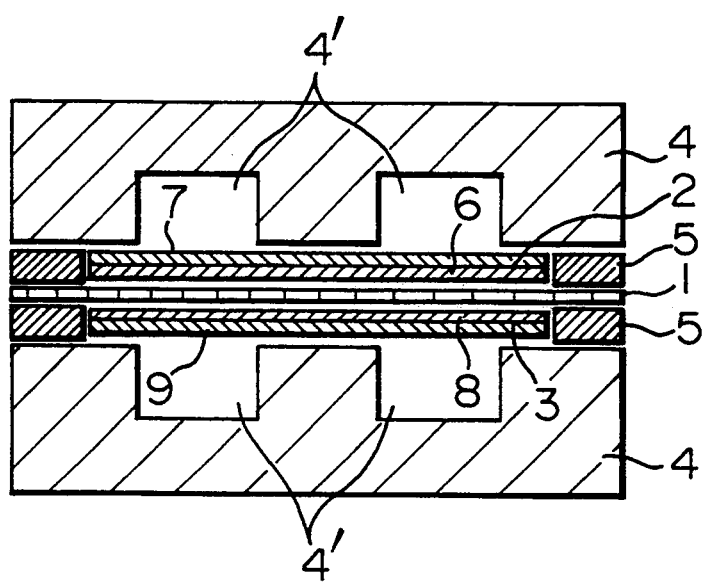
FIG. 1 is a schematic sectional view of a fuel cell of the present invention.
Figure 2:
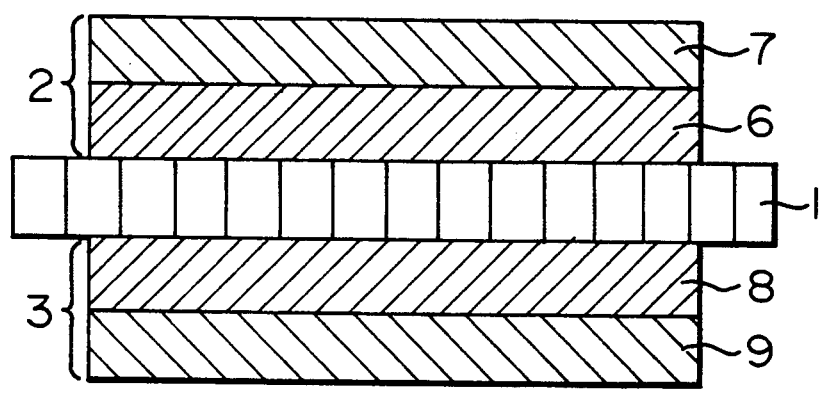
FIG. 2 is a schematic sectional view of two electrodes between which a solid electrolyte membrane is interposed according to the present invention.

A fundamental cell structure of the present invention is shown in FIG. 1. The fuel cell comprises polymer electrolyte membrane 1, hydrogen electrode 2 and oxygen electrode 3 provided on the both sides of the electrolyte membrane 1 and current collectors 4 provided on the outer sides of the hydrogen electrode and the oxygen electrode. The current corrector 4 is provided with some gas feeding grooves 4'. The two current collectors 4 are arranged facing to each other between which the electrolyte membrane 1 and electrodes 2 and 3 are interposed and leakage of the gas is prevented by gas seal 5. FIG. 2 shows the partially enlarged electrolyte membrane and electrodes shown in FIG. 1 and shows the arrangement of the hydrogen electrode 2, the oxygen electrode 3 and solid polymer electrolyte membrane 1 according to the present invention. The hydrogen electrode 2 comprises the catalyst layer 6 and the gas diffusion layer 7 (which acts as an electron conductor) and the oxygen electrode 3 comprises the catalyst layer 8 and the gas diffusion layer 9 (which acts as an electron conductor). The gas diffusion layer can be obtained, for example, by molding carbon fibers and sintering the molded product. The electrolyte membrane 1, the catalyst layer 6, the gas diffusion layer 7, the catalyst layer 8 and the gas diffusion layer 9 are arranged as above and integrated by application of pressure. Each catalyst layer can be obtained by mixing the active component, carbon, the proton conductor and the water-repellent binder and molding the mixture. Important is that the water-repellency of the hydrogen electrode is higher than that of the oxygen electrode.

As mentioned above, according to the present invention, by making higher the water-repellency of the hydrogen electrode than that of the oxygen electrode, wettability of the catalyst layer in the hydrogen electrode is controlled and the electrode reaction in the pores of the catalyst layer of the electrodes is promoted and furthermore, migration of water becomes easy because of the higher hydrophilicity of the oxygen electrode and thus, water can be simply discharged from the system, and cell performance is enhanced and stabilized by improving the gas diffusibility of both the electrodes.

The control of water-repellency is carried out by adding a water-repellent binder with changing its amount to the catalyst layer or by adding binders different in the degree of water-repellency to the respective catalyst layers. The former is characterized in that the water-repellency can be controlled without changing the pore structure of the catalyst layer. The latter is a simple and practical method although the pore structure of the catalyst layer is somewhat changed. As aforementioned, fluorocarbon polymers such as polytetrafluoroethylene (PTFE), graphite fluoride represented by the formula (CF)n or mixtures thereof are used as the water-repellent binder. These are electrical resistors and cannot be contained in a large amount. For example, when the water-repellent binder is polytetrafluoroethylene, the amount thereof is 10 to 40% by weight, preferably 10 to 30% by weight in the oxygen electrode and 20 to 50% by weight, preferably 20 to 40% by weight in the hydrogen electrode on the basis of the total weight of each catalyst layer. The amount in the hydrogen layer is larger by at least 10% by weight than that in the oxygen electrode. Other water-repellent binders may also be used in the same amount as above. The ion-exchange group of the proton conductor is hydrophilic, but other portion is not necessarily hydrophilic. This differs depending on the material of the proton conductor. Accordingly, the effect of adding the proton conductor is not so conspicuous as of the water-repellent binder, but with increase in the addition amount the hydrophilic group increases and the hydrophilicity is surely enhanced. In this way, it is also possible to lower the water-repellency of the catalyst layer of the oxygen electrode than that of the catalyst layer of the hydrogen electrode.

As the proton conductor used for enlarging the effective reaction surface area by adding to the catalyst layer, a perfluorocarbonsulfonic acid resin or perfluorocarboxylic acid resin which are chemically stable are especially preferred considering the severe use condition that it is exposed to an oxidizing atmosphere and reducing atmosphere.

For preparing the electrode, a coating method is suitable. This method comprises previously mixing the active component, the proton conductor and the water-repellent binder and coating the mixture on the electron conductor which is a gas diffusion layer. When the electrode is prepared by this method, the water-repellency of the electrode can be optionally selected by adjusting the addition amount of the water-repellent binder as stated above. Furthermore, in order to form a gradient of water-repellency, there are a method which comprises mixing the catalyst and the proton conductor, coating the mixture on the electron conductor to form the catalyst layer and impregnating the surface of the catalyst with a solution in which the water-repellent binder is dispersed and a method which comprises laminating two layer electrodes differing in water-repellency and integrating these layers. Adjustment of the porosity can be carried out by using a catalyst carrier and a water-repellant differing in particle size and changing the amounts thereof.

Preparation of the catalyst component can be carried out by forming on an electron conductor a catalyst layer on which a noble metal has been previously supported, as a thin film. There may also be employed a method of freshly adding a noble metal component to the surface of the thin film. The deposition of the noble metal component can be attained by impregnation with a solution of a noble metal compound, plating, vapor deposition, ion implantation and others.

In fuel cells, water is added to the hydrogen electrode for inhibition of the electrolyte membrane from drying and acceleration of transfer of protons. If the water-repellency of the catalyst layer of the electrodes is insufficient, the water added covers the pores of the catalyst to hinder the diffusion of gases. Furthermore, when the water-repellency of the oxygen electrode is higher than that of the hydrogen electrode, the amount of water which migrates into the electrolyte membrane is insufficient and the electrolyte membrane is in the dried state. Therefore, transfer of protons is hindered and the electrode reaction does not proceed and the electrode performance is deteriorated. On the other hand, in the oxygen electrode, it is necessary to accelerate the elimination of water of hydration produced by protons and water produced by the electrode reaction from the system and simultaneously to improve the diffusibility of the oxygen gas required for the electrode reaction.

According to the present invention, wettability of the catalyst layer in the hydrogen electrode is controlled by making higher the water-repellency of the hydrogen electrode than that of the oxygen electrode, to thereby eliminate the excess water from the catalyst layer of the hydrogen electrode. Thus, sufficient water can be supplied to the electrolyte membrane, transfer resistance of protons can be diminished, elimination of water from the oxygen electrode can be accelerated and flooding phenomenon due to the water supplied from the electrolyte membrane and the water produced can be inhibited. As a result, enlargement of the effective reaction area and maintenance of stability thereof become possible and a cell of high output density and of stable performance can be realized. However, the fuel cell of the present invention differs from the conventional hydrogen-oxygen fuel cells in that the water-repellency of the hydrogen electrode is higher than that of the oxygen electrode. That is, hydrogen is superior to oxygen in both the electrochemical reaction activity and diffusibility. Therefore, it is an important task for maintaining the performance to ensure the gas diffusibility and reaction surface area of the oxygen electrode and it is devised to make higher the water-repellency of the oxygen electrode. However, in a solid polymer electrolyte type hydrogen-oxygen fuel cell, the effect and advantage of the present invention which are contrary to the conventional common knowledges have been recognized. Even if there is the particularity of solid polymer electrolyte type fuel cell, since the low diffusibility of oxygen is the same, the water-repellency of the oxygen electrode cannot be extremely lowered and there is naturally a limit. When the water-repellant is PTFE, the lower limit is 10% by weight.

The mechanisms of action of other techniques disclosed in the present invention all satisfy the above object. Flowing of water from the hydrogen electrode to the oxygen electrode is accelerated, penetration of water into the gas diffusion layer is inhibited and migration of gas can be made easier by making lower the water-repellency in the portion of the catalyst layer of the hydrogen electrode which face to the solid polymer electrolyte membrane than that in the portion facing to the gas diffusion layer, further making lower the water-repellency of the catalyst layer of the oxygen electrode than that of the portion of the catalyst layer of the hydrogen electrode which face to the solid electrolyte membrane and furthermore making higher the water-repellency of the gas diffusion layer of the oxygen electrode than that of the catalyst layers of the electrodes. Similarly, the water-repellency or hydrophilicity of the electrodes can also be adjusted by adjusting the concentration of the ion conductor added to the catalyst layer of the electrode or the porosity of the catalyst layer. The porosity of the electrode catalyst layer will be explained below.

Since the hydrogen fed to the hydrogen electrode is small in molecular size and high in diffusibility, the diffusion is easy and insufficient feeding of the gas does not occur even if the porosity of the hydrogen electrode is lower than in the oxygen electrode. On the other hand, since the oxygen diffusibility in the oxygen electrode is low and reactivity is also low, it is important to increase the porosity and feed a sufficient amount of the gas. However, the porosity of the electrode has its suitable range and when the porosity is too low, diffusion of the gas is insufficient and the electrode reaction does not proceed. When the porosity is too high, electrical resistance of the catalyst layer of the electrode increases and furthermore, the catalyst layer tends to dry due to the gas and maintenance of the effective area of the reaction site becomes difficult to make it impossible to develop the electrode performances. Thus, the porosity has a proper range and according to the investigation by the inventors this is preferably about 35 to 60% for the hydrogen electrode and is about 40 to 65% for the oxygen electrode. When the porosity of the oxygen electrode is higher by at least 5% than that of the hydrogen electrode, this is effective for balancing the water content between the two electrodes, but the difference of 10% or higher is suitable for improving the electrode performances.

The following nonlimiting examples illustrate the present invention.

EXAMPLE 1

An electrode catalyst comprising carbon powders on which platinum was supported was sufficiently kneaded with a perfluorosulfonic acid ion-exchange resin (Nafion liquid manufactured by Aldrich Chemical Co.) as a proton conductor and an aqueous suspension of PTFE to prepare a paste. This paste was coated on a carbon paper of about 100 μm in pore diameter and 100 μm thick coated with PTFE which was an electron conductor (gas diffusion layer). This was dried at 80° C. to obtain an electrode. The above electron conductor was obtained by coating an aqueous suspension of PTFE on the carbon paper at a coating amount of 12 mg/cm$^2$ and firing it at 350° C. The composition of the hydrogen electrode was as follows: amount of platinum: 0.3 mg/cm$^2$, amount of the above proton conductor: 30% by weight and amount of PTFE: 30% by weight. The composition of the oxygen electrode was as follows: amount of platinum: 0.3 mg/cm$^2$ amount of the above proton conductor: 20% by weight and amount of PTFE: 20% by weight.

For comparison, a hydrogen electrode and an oxygen electrode both having the same composition of amount of platinum: 0.3 mg/cm$^2$, amount of the above proton conductor: 20% by weight and amount of PTFE: 20% by weight were prepared as conventional electrodes.

Figure 3:
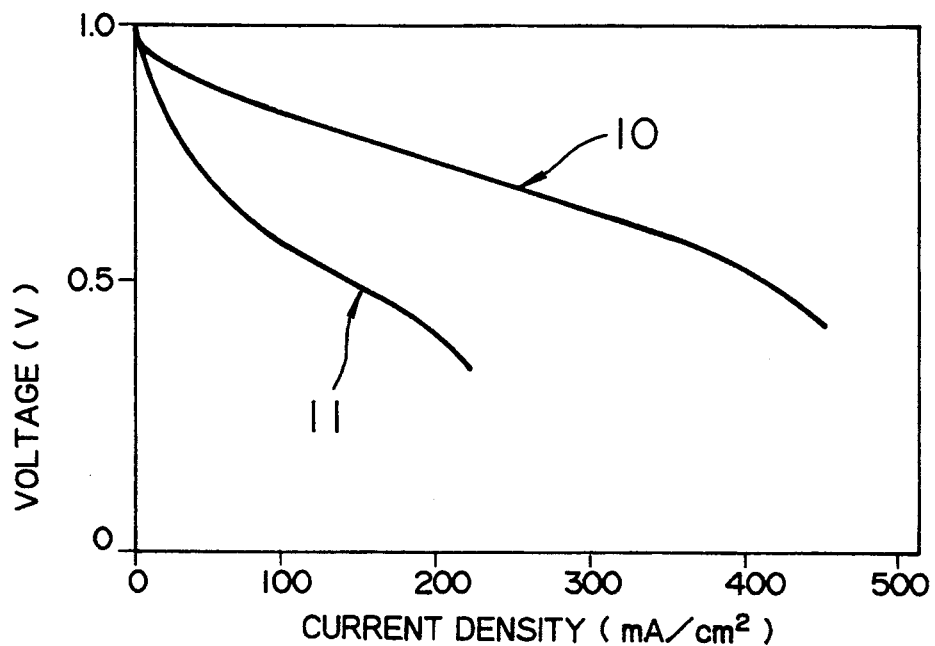
FIG. 3 is a graph which shows the relation between the current density and the voltage characteristics of the fuel cell according to Example 1 of the present invention.

Adhesion of the electrode to the solid polymer electrolyte membrane which is a proton conductor was carried out by hot press method. Nafion 117 manufactured by DuPont de Nemours, E. I., Co. was used as the solid polymer electrolyte membrane. The hydrogen electrode and the oxygen electrode between which the solid polymer electrolyte membrane was interposed were pressed under a pressure of 100 kg/cm$^2$ and at 120° C. for 15 minutes. The resulting electrode assembly was incorporated into a measuring cell and the relation of current density-voltage characteristics was measured at 80° C. under 1 atm. The results are shown in FIG. 3. The curve 11 showing the conventional the cell performance indicates that the critical current density was 200 mA/cm$^2$ while the curve 10 showing the cell performance of the present invention indicates that the critical current density was more than 450 mA/cm$^2$. That is, the cell performance was able to be greatly improved by increasing the water-repellency of the hydrogen electrode than that of the oxygen electrode.

EXAMPLE 2

Figure 4:
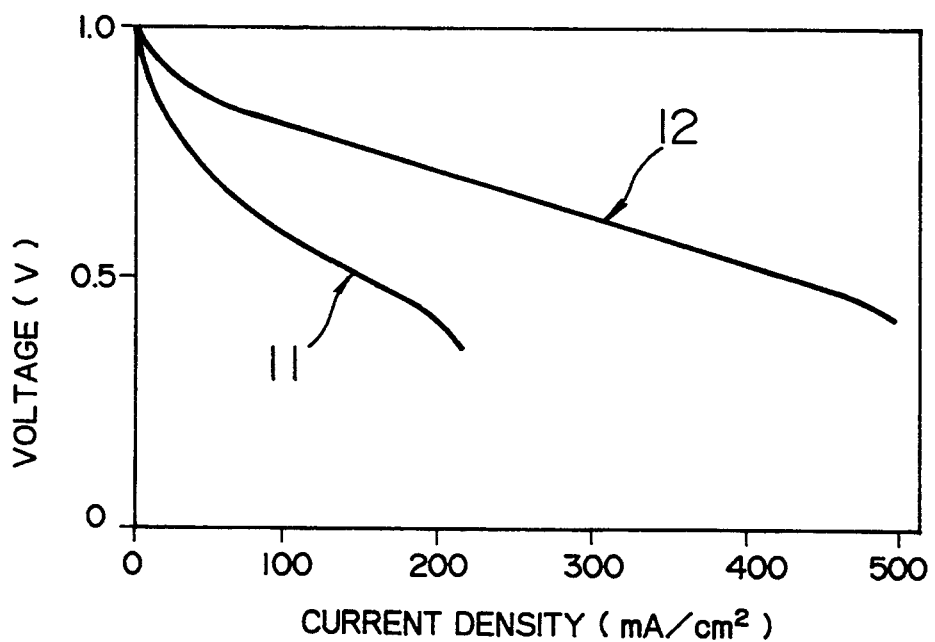
FIG. 4 is a graph which shows the relation between the current density and the voltage characteristics of the fuel cell according to Example 2 of the present invention.

Electrodes were prepared in the following manner. A catalyst comprising a carbon carrier on which platinum was supported and a perfluorocarboxylic acid resin which was a proton conductor were sufficiently kneaded to obtain a catalyst paste. This paste was rolled by a roll press to obtain a plurality of sheets. These sheets were impregnated with an aqueous PTFE suspension having a PTFE concentration of 20% by weight and dried at 80° C. to obtain sheet-like catalyst layers. Then, these sheet-like catalyst layers were impregnated with another aqueous PTFE suspension having a PTFE concentration different from that of the above suspension and dried at 80° C. In this way, electrodes were prepared in which the catalyst layer of both the hydrogen electrode and the oxygen electrode had a concentration gradient of the water-repellant in the thickness direction of the catalyst layer. The catalyst layer of the hydrogen electrode had such a concentration gradient of the water-repellant as 20% by weight in the portion facing to the electrolyte membrane and 40% by weight in the portion facing to the gas diffusion layer. The catalyst layer of the oxygen electrode had such a concentration gradient of the water-repellant as 10% by weight in the portion facing to the electrolyte membrane and 30% by weight in the portion facing to the gas diffusion layer. The difference between the water-repellant concentration of the hydrogen electrode and that of the oxygen electrode was at least 10% by weight. The resulting sheet-like catalyst layer was roll pressed onto a carbon paper to integrate them to obtain an electrode. Comparison was made under the same conditions as in Example 1. The results obtained are shown in FIG. 4. As can be seen from curve 12 showing the cell performances of the present invention, the critical current density was more than 500 mA/cm$^2$. Thus, it is recognized that the cell performances can be markedly improved by allowing the catalyst layers of the respective hydrogen electrode and the oxygen electrode to have a gradient of water-repellant concentration.

EXAMPLE 3

Figure 5:
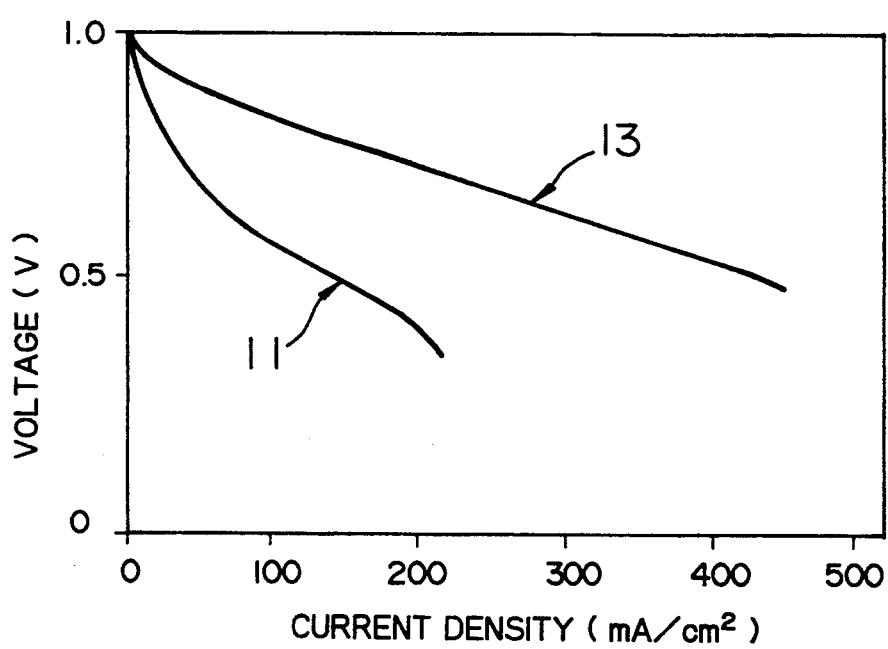
FIG. 5 is a graph which shows the relation between the current density and the voltage characteristics of the fuel cell according to Example 3 of the present invention.

A hydrogen electrode and an oxygen electrode in which each of the catalyst layer had such a porosity which differed in the portion facing to the electron conductor, namely, the gas diffusion layer and in the portion facing to the electrolyte membrane were made in the following manner. Each of the electrode was composed of two layers. Carbon carrier particles of 3 μm in average particle size on which platinum was supported, 30% by weight of an ion-exchange resin (perfluorocarbonsulfonic acid resin) and 40% by weight of PTFE were kneaded to prepare a paste. This paste was coated on a carbon paper and dried at 80° C. to obtain the layer of electron conductor side. Thereon was further coated a paste prepared by kneading carbon carrier particles of 1 μm in average particle size on which platinum was supported, 30% by weight of the same ion-exchange resin as above and 40% by weight of PTFE and dried at 80° C. Thus, there was obtained a catalyst layer of a hydrogen electrode having a porosity of 50% in the portion facing to the electron conductor and a porosity of 40% in the portion facing to the electrolyte membrane. Moreover, a paste prepared by kneading carbon carrier particles of 6 μm in average particle size on which platinum catalyst was supported, 20% by weight of an ion-exchange resin (perfluorocarbonsulfonic acid resin) and 30% by weight of PTFE was coated on a carbon paper and dried at 80° C. Thereon was further coated a paste prepared by kneading carbon carrier particles of 3 μm in average particle size on which platinum catalyst was supported, 20% by weight of the same ion-exchange resin as above and 30% by weight of PTFE and dried at 80° C. The resulting catalyst layer of oxygen electrode had a porosity of 50% in the portion facing to the electrolyte membrane and 60% in the portion facing to the electron conductor. Comparison was made under the same conditions as in Example 1. The results are shown in FIG. 5. As can be seen from the curve 13 showing the cell performances of the present invention, the critical current density was more than 500 mA/cm$^2$. That is, when the porosity of the oxygen electrode is higher than that of the hydrogen electrode, the cell performances can be greatly improved.

As is clear from the above results, according to the present invention, activities of the hydrogen electrode and the oxygen electrode of solid polymer electrolyte type fuel cells can be sharply improved over those of conventional electrodes and an output density of about 2 to 3 times that of the conventional cells can be obtained.

What is claimed is:

1. A solid polymer electrolyte type fuel cell which comprises a hydrogen electrode and an oxygen electrode as gas diffusion electrodes, a solid polymer electrolyte membrane interposed between said electrodes and means for feeding a hydrogen-containing gas and an oxygen-containing gas to the hydrogen electrode and the oxygen electrode, respectively, each of said gas diffusion electrodes comprising a catalyst layer comprised of a carbon carrier, an active component supported on the carrier, a proton conductor and a water-repellent binder and an electron conductor provided on an outer side of the catalyst layer and serving also as a gas diffusion layer, characterized in that the water-repellency of the catalyst layer of the hydrogen electrode is higher than that of the catalyst layer of the oxygen electrode.

2. A solid polymer electrolyte type fuel cell according to claim 1, wherein the water-repellency of the catalyst layer of the hydrogen electrode and of the catalyst layer of the oxygen electrode is lower in a portion facing to the solid polymer electrolyte membrane than in a portion facing to the gas diffusion layer, and the water-repellency for the portion facing to the solid polymer electrolyte membrane in the catalyst layer of the oxygen electrode is lower than that for the portion facing to the solid polymer electrolyte membrane in the catalyst layer of the hydrogen electrode.

3. A solid polymer electrolyte type fuel cell according to claim 1, wherein the amount of the water-repellent binder in the catalyst layer of the oxygen electrode is 10 to 40% by weight based on the total weight of the catalyst layer and the amount of the water-repellent binder in the catalyst layer of the hydrogen electrode is 20 to 50% by weight based on the total weight of the catalyst layer and the amount of the water-repellent binder in the hydrogen electrode is larger by at least 10% by weight than in the oxygen electrode.

4. A solid polymer electrolyte type fuel cell according to claim 1, wherein the amount of the water-repellent binder in the catalyst layer of the oxygen electrode is 10 to 30% by weight based on the total weight of the catalyst layer and the amount of the water-repellent binder in the catalyst layer of the hydrogen electrode is 20 to 40% by weight based on the total weight of the catalyst layer and the amount of the water-repellent binder in the hydrogen electrode is larger by at least 10% by weight than in the oxygen electrode.

5. A solid polymer electrolyte type fuel cell according to claim 2, wherein the amount of the water-repellent binder in the portion facing to the solid polymer electrolyte membrane in the catalyst layer of the hydrogen electrode is larger by at least 10% by weight than in the portion facing to the solid polymer electrolyte membrane in the catalyst layer of the oxygen electrode.

6. A solid polymer electrolyte type fuel cell according to claim 1, wherein the catalyst layer of the hydrogen electrode has a lower porosity than the catalyst layer of the oxygen electrode.

7. A solid polymer electrolyte type fuel cell according to claim 3, wherein the porosity of the catalyst layer of the hydrogen electrode is 35 to 60% and that of the catalyst layer of the oxygen electrode is 40 to 65%.

8. A solid polymer electrolyte type fuel cell according to claim 1, wherein each of the catalyst layers of the oxygen electrode and the hydrogen electrode consists of two or more layers, and a portion facing to the gas diffusion layer in each catalyst layer has a higher water-repellency than that of another portion.

9. A solid polymer electrolyte type fuel cell according to claim 1, wherein the solid polymer electrolyte membrane comprises a perfluorocarbonsulfonic acid resin or a perfluorocarboxylic acid resin.

10. A solid polymer electrolyte type fuel cell according to claim 1, wherein the active component is a platinum group metal.

11. A solid polymer electrolyte type fuel cell according to claim 1, wherein the electron conductor is arranged over the catalyst layer to face a side of the catalyst layer opposite to a side of the catalyst layer facing the solid polymer electrolyte membrane and the water-repellency of the catalyst layer of the hydrogen electrode has such a gradient that the water-repellency is lower in a portion facing the solid polymer electrolyte membrane than in a portion facing the gas diffusion layer.

* * * * *